United States Patent
Nakayama

(10) Patent No.: US 11,094,926 B2
(45) Date of Patent: Aug. 17, 2021

(54) NONAQUEOUS ELECTROLYTE SECONDARY BATTERY INCLUDING TRILITHIUM PHOSPHATE AND LITHIUM FLUOROSULFONATE

(71) Applicant: TOYOTA JIDOSHA KABUSHIKI KAISHA, Toyota (JP)

(72) Inventor: Tetsuri Nakayama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/113,380

(22) Filed: Aug. 27, 2018

(65) Prior Publication Data

US 2019/0081318 A1    Mar. 14, 2019

(30) Foreign Application Priority Data

Sep. 11, 2017  (JP) .............................. JP2017-174332

(51) Int. Cl.
| | | |
|---|---|---|
| H01M 6/04 | (2006.01) | |
| H01M 4/36 | (2006.01) | |
| H01M 10/0567 | (2010.01) | |
| H01M 4/525 | (2010.01) | |
| H01M 10/0525 | (2010.01) | |
| H01M 4/505 | (2010.01) | |
| H01M 4/58 | (2010.01) | |
| H01M 4/485 | (2010.01) | |
| H01M 10/0568 | (2010.01) | |

(52) U.S. Cl.
CPC .......... *H01M 4/364* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/0567* (2013.01); *H01M 10/0568* (2013.01)

(58) Field of Classification Search
CPC ...... H01M 4/364; H01M 4/505; H01M 4/525; H01M 4/5825; H01M 10/052; H01M 10/0525; H01M 10/0567
See application file for complete search history.

(56) References Cited

U.S. PATENT DOCUMENTS

| | | |
|---|---|---|
| 2012/0308881 A1 | 12/2012 | Tokuda et al. |
| 2014/0356709 A1 | 12/2014 | Arikawa et al. |
| 2016/0226106 A1 | 8/2016 | Minami et al. |
| 2016/0322669 A1 | 11/2016 | Sawa et al. |
| 2016/0380303 A1 | 12/2016 | Minami et al. |
| 2017/0077550 A1* | 3/2017 | Nishie ................. H01M 10/052 |
| 2017/0092979 A1* | 3/2017 | Chiga ............... H01M 10/0422 |
| 2017/0338466 A1* | 11/2017 | Nishide ................ H01M 4/505 |
| 2018/0026305 A1 | 1/2018 | Takada et al. |
| 2018/0366724 A1 | 12/2018 | Niina et al. |

FOREIGN PATENT DOCUMENTS

| | | |
|---|---|---|
| CN | 104106162 A | 10/2014 |
| CN | 105518908 A | 4/2016 |
| CN | 105845979 A | 8/2016 |
| EP | 3098893 A1 | 11/2016 |
| JP | 2011-187440 A | 9/2011 |
| JP | 2016029668 A | 3/2016 |
| JP | 2017010819 A | 1/2017 |
| KR | 10-2016-0107262 A | 9/2016 |
| WO | 2015028869 A1 | 3/2015 |
| WO | 2016136210 A1 | 9/2016 |
| WO | 2017110080 A1 | 6/2017 |

* cited by examiner

*Primary Examiner* — Raymond Alejandro
(74) *Attorney, Agent, or Firm* — Sughrue Mion, PLLC

(57) ABSTRACT

Provided is a nonaqueous electrolyte secondary battery in which lithium fluorosulfonate is added to a nonaqueous electrolytic solution and which exhibits excellent low-temperature performance. The nonaqueous electrolyte secondary battery disclosed herein includes a positive electrode, a negative electrode, and a nonaqueous electrolytic solution. The positive electrode includes a positive electrode active material layer. The positive electrode active material layer includes trilithium phosphate and, as a positive electrode active material, a lithium transition metal composite oxide including at least lithium, nickel, manganese, and cobalt. The nonaqueous electrolytic solution includes lithium fluorosulfonate. A mass ratio of trilithium phosphate to the positive electrode active material is 1% by mass or more and 5% by mass or less. A content of lithium fluorosulfonate in the nonaqueous electrolytic solution is 0.15% by mass or more and 1.0% by mass or less.

4 Claims, 2 Drawing Sheets

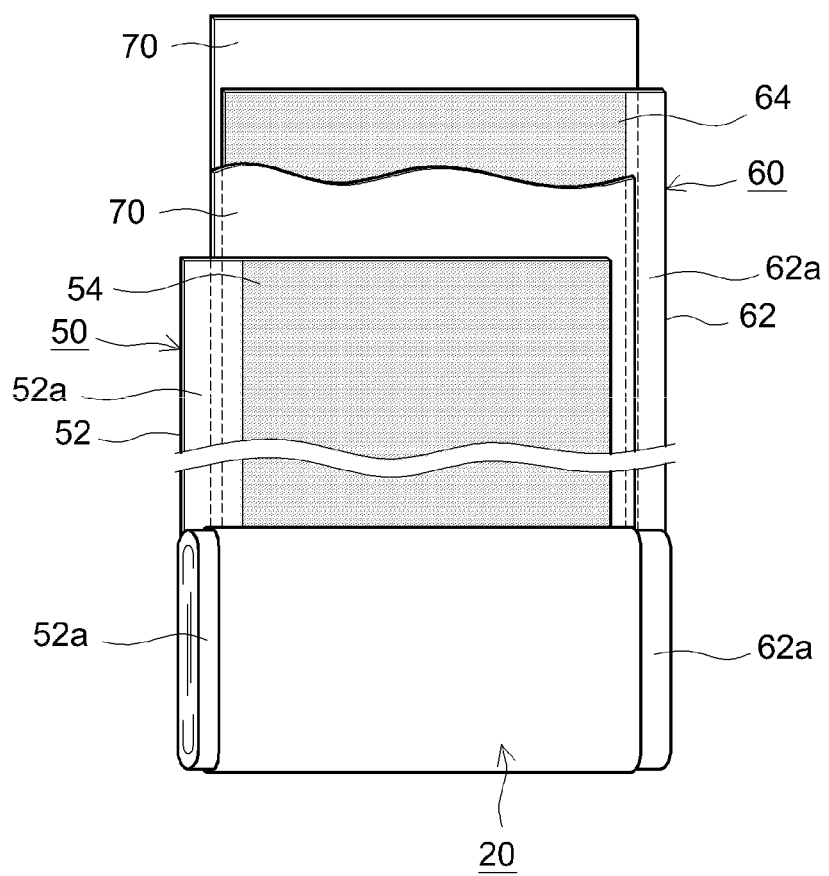

NONAQUEOUS ELECTROLYTE SECONDARY BATTERY INCLUDING TRILITHIUM PHOSPHATE AND LITHIUM FLUOROSULFONATE

BACKGROUND OF THE INVENTION

1. Field of the Invention

The present teaching relates to a nonaqueous electrolyte secondary battery. The present application claims priority based on Japanese Patent Application No. 2017-174332 filed on Sep. 11, 2017, the entire contents of which are incorporated herein by reference.

2. Description of the Related Art

In recent years, nonaqueous electrolyte secondary batteries such as lithium ion secondary batteries have been advantageously used as portable power sources for personal computers, mobile terminals and the like and driving power sources for vehicles such as electric vehicles (EV), hybrid vehicles (HV), and plug-in hybrid vehicles (PHV).

With the widespread use of nonaqueous electrolyte secondary batteries, further improvement in performance is desired. A technique of adding lithium fluorosulfonate to a nonaqueous electrolytic solution in order to improve the performance of a nonaqueous electrolyte secondary battery is known (see, for example, Japanese Patent Application Publication No. 2011-187440).

SUMMARY OF THE INVENTION

However, as a result of intensive research conducted by the inventor of the present teaching, it was found that the technique disclosed in Japanese Patent Application Publication No. 2011-187440 has a problem in low-temperature performance. Specifically, it was found that the technique disclosed in Japanese Patent Application Publication No. 2011-187440 has a problem that the discharge capacity is not sufficient when large current flows at low temperature.

In view of the above, it is an object of the present teaching to provide a nonaqueous electrolyte secondary battery in which lithium fluorosulfonate is added to a nonaqueous electrolytic solution and which demonstrates excellent low-temperature performance.

The nonaqueous electrolyte secondary battery disclosed herein includes a positive electrode, a negative electrode, and a nonaqueous electrolytic solution. The positive electrode includes a positive electrode active material layer. The positive electrode active material layer includes trilithium phosphate and, as a positive electrode active material, a lithium transition metal composite oxide including at least lithium, nickel, manganese, and cobalt. The nonaqueous electrolytic solution includes lithium fluorosulfonate. A mass ratio of trilithium phosphate to the positive electrode active material is 1% by mass or more and 5% by mass or less. A content of lithium fluorosulfonate in the nonaqueous electrolytic solution is 0.15% by mass or more and 1.0% by mass or less.

It is conceivable that where the mass ratio of trilithium phosphate to the positive electrode active material is less than 1% by mass, the content of phosphorus in the coating film formed on the surface of the positive electrode active material is insufficient and the amount of organic component in the coating film increases. As a result, the function of protecting the positive electrode active material demonstrated by the coating film is decreased and low-temperature performance deteriorates. It is also conceivable that where the mass ratio of trilithium phosphate to the positive electrode active material exceeds 5% by mass, the content of phosphorus in the coating film formed on the surface of the positive electrode active material becomes excessive, an inorganic component locally grows in the coating film, and compactness of the coating film is decreased. As a result, low-temperature performance deteriorates. Where the content of lithium fluorosulfonate is less than 0.15% by mass, the formation of a coating film on the surface of the positive electrode active material becomes insufficient and the ion conductivity (in particular, the conductivity of ions serving as charge carriers) is lowered, which apparently results in increased electric resistance and deteriorated low-temperature performance. Where the content of lithium fluorosulfonate exceeds 1.0% by mass, the amount of the coating film formed becomes too large and the electron conductivity decreases, which apparently results in increased electric resistance and deteriorated low-temperature performance.

Therefore, by adequately controlling the content of trilithium phosphate and the content of lithium fluorosulfonate in the nonaqueous electrolytic solution, it is possible to adequately decompose both trilithium phosphate and lithium fluorosulfonate and to form a coating film having high ion conductivity (in particular, the conductivity of ions serving as charge carriers) on the surface of the positive electrode active material. Because of such features, it is possible to provide a nonaqueous electrolyte secondary battery in which lithium fluorosulfonate is added to a nonaqueous electrolytic solution and which excels in low-temperature performance.

In a desired embodiment of the nonaqueous electrolyte secondary battery disclosed herein, trilithium phosphate has a particulate shape with an average particle diameter of 10 μm or less.

Because of such a feature, trilithium phosphate is likely to decompose uniformly during the formation of the coating film, compactness of the coating film formed can be increased, and low-temperature performance of the nonaqueous electrolyte secondary battery can be improved more.

In a desired embodiment of the nonaqueous electrolyte secondary battery disclosed herein, a content of nickel with respect to a total content of nickel, manganese, and cobalt in the lithium transition metal composite oxide is 34 mol % or more.

Because of such a feature, the electric resistance of the nonaqueous electrolyte secondary battery decreases and the capacity increases.

In a desired embodiment of the nonaqueous electrolyte secondary battery disclosed herein, the nonaqueous electrolytic solution further includes lithium bis(oxalato)borate.

Because of such a feature, the lithium bis(oxalato)borate promotes the decomposition reaction of the nonaqueous electrolytic solution, a more uniform coating film can be obtained, and the low-temperature performance of the nonaqueous electrolyte secondary battery can be improved more.

In a further desired embodiment, the content of lithium bis(oxalato)borate in the nonaqueous electrolytic solution is 0.1% by mass or more.

Because of such a feature, the coating film improvement effect demonstrated by lithium bis(oxalato)borate is enhanced, and the low-temperature performance can be further improved.

In a more desired embodiment, a content of lithium bis(oxalato)borate in the nonaqueous electrolytic solution is 0.5% by mass or more.

Because of such a feature, the coating film improvement effect demonstrated by lithium bis(oxalato)borate is further enhanced, and the low-temperature performance can be much further improved.

In a desired embodiment of the nonaqueous electrolyte secondary battery disclosed herein, the nonaqueous electrolytic solution further includes lithium difluorophosphate.

Because of such a feature, it is possible to further improve the ion conductivity (in particular, the conductivity of ions serving as charge carriers) of the coating film, and it is possible to improve more the low-temperature performance of the nonaqueous electrolyte secondary battery.

In a more desired embodiment, a content of lithium difluorophosphate in the nonaqueous electrolytic solution is 0.1% by mass or more.

Because of such a feature, the coating film improvement effect demonstrated by lithium difluorophosphate is enhanced, and the low-temperature performance can be further improved.

In a further desired embodiment, the content of lithium difluorophosphate in the nonaqueous electrolytic solution is 0.5% by mass or more.

Because of such a feature, the coating film improvement effect demonstrated by lithium difluorophosphate is further enhanced, and the low-temperature performance can be much further improved.

BRIEF DESCRIPTION OF THE DRAWINGS

FIG. 2 is a schematic view showing the configuration of a wound electrode body of a lithium ion secondary battery according to one embodiment of the present teaching.

DESCRIPTION OF THE PREFERRED EMBODIMENT

Figure 1:
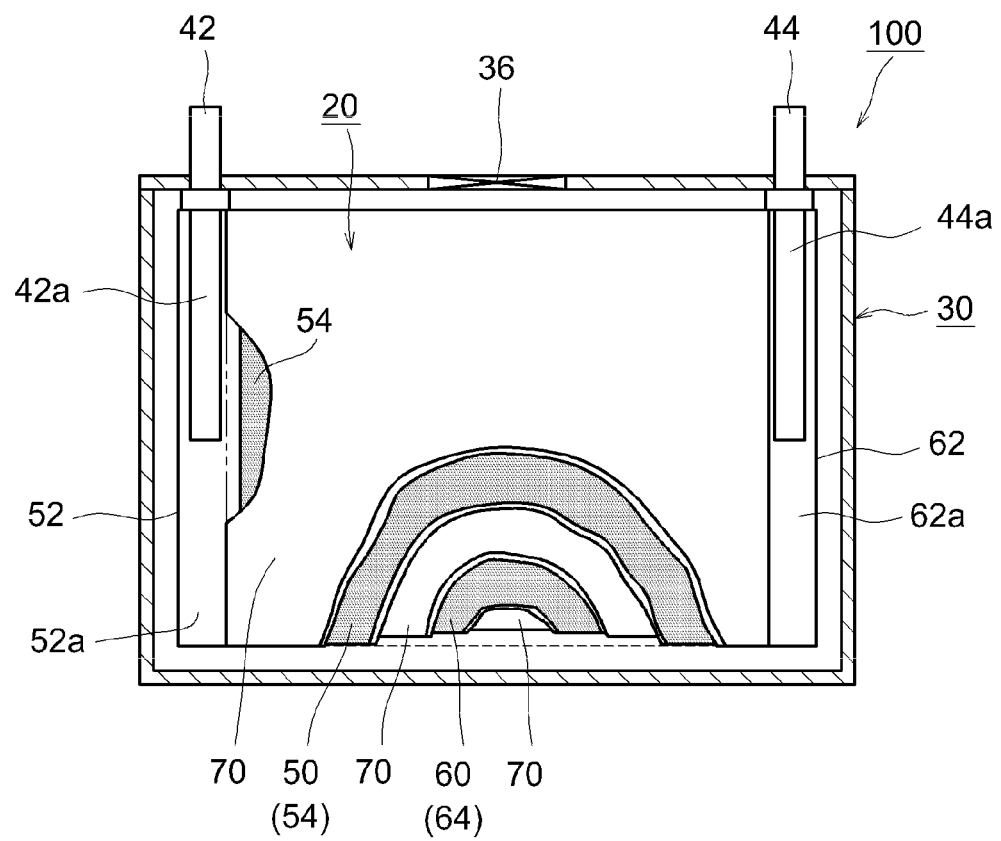
FIG. 1 is a cross-sectional view schematically showing the internal structure of a lithium ion secondary battery according to one embodiment of the present teaching.

An embodiment of the present teaching will be described below with reference to the drawings. Incidentally, the matters other than those specifically mentioned in the present specification and necessary for the implementation of the present teaching (for example, the general configuration and production process of a nonaqueous electrolyte secondary battery not characterizing the present teaching) can be understood as design matters to be addressed by a person skilled in the art on the basis of the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

In this specification, the term "secondary battery" generally refers to a power storage device that can be repeatedly charged and discharged, and this term is inclusive of power storage elements such as a so-called power storage battery and an electric double layer capacitor.

Further, the term "nonaqueous electrolyte secondary battery" refers to a battery including a nonaqueous electrolytic solution (typically, a nonaqueous electrolytic solution including a supporting electrolyte in a nonaqueous solvent).

Hereinafter, the present teaching will be described in detail by taking a flat angular lithium ion secondary battery having a flat-shaped wound electrode body and a flat-shaped battery case as an example, but the present teaching is not intended to be limited to the configuration described in the embodiment.

A lithium ion secondary battery 100 shown in FIG. 1 is a sealed battery constructed by accommodating a flat-shaped wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection and a thin safety valve 36 which is set so as to release an internal pressure when the internal pressure of the battery case 30 rises to a predetermined level or higher. In addition, an injection port (not shown) for injecting the nonaqueous electrolytic solution is provided in the battery case 30. The positive electrode terminal 42 is electrically connected to the positive electrode current collector plate 42a. The negative electrode terminal 44 is electrically connected to the negative electrode current collector plate 44a. As a material of the battery case 30, for example, a lightweight metal material having good thermal conductivity such as aluminum is used.

As shown in FIGS. 1 and 2, the wound electrode body 20 has a structure obtained by laminating a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode current collector 62, with two elongated separator sheets 70 being interposed therebetween, and winding the laminate in the longitudinal direction. A positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed), which are formed to protrude to the outside from both ends of the wound electrode body 20 in the winding axis direction (that is, a sheet width direction orthogonal to the longitudinal direction) are joined to a positive electrode current collector plate 42a and a negative electrode current collector plate 44a, respectively.

The positive electrode current collector 52 constituting the positive electrode sheet 50 is exemplified by an aluminum foil or the like.

The positive electrode active material layer 54 includes trilithium phosphate ($Li_3PO_4$). It is conceivable that the trilithium phosphate is a component contributing to the formation of a coating film on the active material surface and that the formed coating film includes phosphorus atoms derived from trilithium phosphate.

It is desirable that trilithium phosphate be in a particulate shape with an average particle diameter of 10 μm or less. In this case, trilithium phosphate is likely to decompose uniformly during the formation of the coating film, compactness of the coating film formed can be increased, and low-temperature performance of the lithium ion secondary battery 100 can be further improved. Meanwhile, from the viewpoint of preventing excessive decomposition of trilithium phosphate caused by the increase in specific surface area, it is desirable that trilithium phosphate be in a particulate shape with an average particle diameter of 1 μm or more.

The average particle diameter of trilithium phosphate can be measured, for example, as a value of the particle diameter (D50) at 50% accumulation from a fine particle side in a cumulative particle size distribution curve obtained by a laser diffraction-scattering method using N-methyl pyrrolidone for a solvent.

The positive electrode active material layer 54 includes, as a positive electrode active material, a lithium transition metal composite oxide including at least lithium, nickel, manganese, and cobalt. That is, in the present embodiment, a lithium-nickel-manganese-cobalt-based composite oxide is used as the positive electrode active material. The lithium-nickel-manganese-cobalt-based composite oxide desirably has a layered rock salt type structure.

The content of nickel with respect to the total content of nickel, manganese, and cobalt in the lithium-nickel-manganese-cobalt-based composite oxide is not particularly limited, but is desirably 34 mol % or more. In this case, the electric resistance of the lithium ion secondary battery 100 decreases and the capacity increases. From the viewpoint of not lowering the performance of the lithium-nickel-manganese-cobalt-based composite oxide as the positive electrode active material, the content of nickel with respect to the total content of nickel, manganese, and cobalt is desirably 60 mol % or less.

The lithium-nickel-manganese-cobalt-based composite oxide may further include a metal element other than lithium, nickel, manganese, and cobalt (for example, Zr, Mo, W, Mg, Ca, Na, Fe, Cr, Zn, Si, Sn, Al, and the like).

A lithium-nickel-manganese-cobalt-based composite oxide represented by a following Formula (I) can be advantageously used as the positive electrode active material.

$$Li_aNi_xMn_yCo_zO_2 \quad (I)$$

Here, a satisfies $0.98 \leq a \leq 1.20$; x, y and z satisfy $x+y+z=1$; x desirably satisfies $0.20 \leq x \leq 0.60$, and more desirably $0.34 \leq x \leq 0.60$; y desirably satisfies $0 < y \leq 0.50$, and more desirably $0 < y \leq 0.40$; and z desirably satisfies $0 < z \leq 0.50$, and more desirably $0 < z \leq 0.40$.

The positive electrode active material layer 54 may further include a positive electrode active material other than the lithium-nickel-manganese-cobalt-based composite oxide within a range in which the effect of the present teaching is not impaired.

The content of the positive electrode active material is desirably 70% by mass or more, and more desirably 75% by mass or more in the positive electrode active material layer 54 (that is, with respect to the total mass of the positive electrode active material layer 54).

In the present embodiment, the mass ratio of trilithium phosphate to the positive electrode active material is 1% by mass or more and 5% by mass or less.

It is conceivable that where the mass ratio of trilithium phosphate to the positive electrode active material is less than 1% by mass, the content of phosphorus in the coating film formed on the surface of the positive electrode active material is insufficient and the amount of organic component in the coating film increases. As a result, the function of protecting the positive electrode active material demonstrated by the coating film is decreased and low-temperature performance deteriorates. It is also conceivable that where the mass ratio of trilithium phosphate to the positive electrode active material exceeds 5% by mass, the content of phosphorus in the coating film formed on the surface of the positive electrode active material becomes excessive, an inorganic component locally grows in the coating film, and compactness of the coating film is decreased. As a result, low-temperature performance deteriorates.

The mass ratio of trilithium phosphate to the positive electrode active material is desirably 1% by mass or more and 4% by mass or less, and more desirably 1.5% by mass or more and 3% by mass or less.

The positive electrode active material layer 54 may include components other than trilithium phosphate and the positive electrode active material. Examples thereof include a conductive material, a binder, and the like.

For example, carbon black such as acetylene black (AB) or other carbon materials (for example, graphite or the like) can be advantageously used as the conductive material. The content of the conductive material in the positive electrode active material layer 54 is desirably 1% by mass or more and 15% by mass or less, and more desirably 3% by mass or more and 12% by mass or less.

For example, polyvinylidene fluoride (PVdF) or the like can be used as the binder. The content of the binder in the positive electrode active material layer 54 is desirably 1% by mass or more and 15% by mass or less, and more desirably 2% by mass or more and 12% by mass or less.

The negative electrode current collector 62 constituting the negative electrode sheet 60 can be exemplified by a copper foil or the like. For example, a carbon material such as graphite, hard carbon, soft carbon or the like can be used as the negative electrode active material to be included in the negative electrode active material layer 64. The graphite may be natural graphite or artificial graphite, and may be amorphous carbon-coated graphite in which graphite is coated with an amorphous carbon material. The negative electrode active material layer 64 may include components other than the active material, such as a binder and a thickener. For example, styrene butadiene rubber (SBR) or the like can be used as the binder. For example, carboxymethyl cellulose (CMC) or the like can be used as the thickener.

The content of the negative electrode active material in the negative electrode active material layer is desirably 90% by mass or more, and more desirably 95% by mass or more and 99% by mass or less. The content of the binder in the negative electrode active material layer is desirably 0.1% by mass or more and 8% by mass or less, and more desirably 0.5% by mass or more and 3% by mass or less. The content of the thickener in the negative electrode active material layer is desirably 0.3% by mass or more and 3% by mass or less, and more desirably 0.5% by mass or more and 2% by mass or less.

The separator 70 can be exemplified a porous sheet (film) made of a resin such as polyethylene (PE), polypropylene (PP), a polyester, cellulose, a polyamide and the like. Such a porous sheet may have a single layer structure or a laminate structure of two or more layers (for example, a three-layer structure in which a PP layer is laminated on both surfaces of a PE layer). A heat-resistant layer (HRL) may be provided on the surface of the separator 70.

The nonaqueous electrolytic solution includes lithium fluorosulfonate. Lithium fluorosulfonate is also a component contributing to the formation of a coating film on the active material surface.

The nonaqueous electrolytic solution typically includes a nonaqueous solvent and a supporting salt.

As the nonaqueous solvent, an organic solvent such as various carbonates, ethers, esters, nitriles, sulfones, lactones and the like usable for an electrolytic solution of a general lithium ion secondary battery can be used without particular limitation. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. Such nonaqueous solvents may be used singly or in appropriate combination of two or more thereof.

As the supporting salt, for example, a lithium salt such as $LiPF_6$, $LiBF_4$, $LiClO_4$ or the like (desirably $LiPF_6$) can be used. The concentration of the supporting salt is desirably 0.7 mol/L or more and 1.3 mol/L or less.

The content of lithium fluorosulfonate in the nonaqueous electrolytic solution is 0.15% by mass or more and 1.0% by mass or less.

Where the content of lithium fluorosulfonate is less than 0.15% by mass, the formation of a coating film on the surface of the positive electrode active material becomes insufficient and the ion conductivity (in particular, the conductivity of ions (for example, Li or the like) serving as charge carriers) is lowered, which apparently results in increased electric resistance and deteriorated low-temperature performance. Where the content of lithium fluorosulfonate exceeds 1.0% by mass, the amount of the coating film formed becomes too large and the electron conductivity decreases, which apparently results in increased electric resistance and deteriorated low-temperature performance.

The content of lithium fluorosulfonate in the nonaqueous electrolytic solution is desirably 0.2% by mass or more and 0.85% by mass or less, and more desirably 0.3% by mass or more and 0.8% by mass or less.

The nonaqueous electrolytic solution desirably further includes lithium bis(oxalato)borate. In this case, the lithium bis(oxalato)borate promotes the decomposition reaction of the nonaqueous electrolytic solution, a more uniform coating film can be obtained, and the low-temperature performance of the lithium ion secondary battery 100 is further improved. The content of lithium bis(oxalato)borate in the nonaqueous electrolytic solution is desirably 0.1% by mass or more, and more desirably 0.5% by mass or more, because the coating film improvement effect demonstrated by lithium bis(oxalato)borate is increased and the low-temperature performance of the lithium ion secondary battery 100 is further improved. Meanwhile, where the content of lithium bis(oxalato)borate is too high, the amount of the coating film formed becomes too large and the electric resistance can be increased. Therefore, the content of lithium bis(oxalato) borate in the nonaqueous electrolytic solution is desirably 1.0% by mass or less.

The nonaqueous electrolytic solution desirably further includes lithium difluorophosphate. In this case, it is possible to improve the ion conductivity (in particular, the conductivity of ions (for example, Li or the like) serving as charge carriers) of the coating film, and it is possible to further improve the low-temperature performance of the lithium ion secondary battery 100. The content of lithium difluorophosphate in the nonaqueous electrolytic solution is desirably 0.1% by mass or more, and more desirably 0.5% by mass or more, because the coating film improvement effect demonstrated by lithium difluorophosphate is increased, and the low-temperature performance of the lithium ion secondary battery 100 can be further improved. Meanwhile, where the content of lithium difluorophosphate is too high, the amount of the coating film formed becomes too large and the electric resistance can be increased. Therefore, the content of lithium difluorophosphate in the nonaqueous electrolytic solution is desirably 1.0% by mass or less.

As long as the effect of the present teaching is not remarkably impaired, the nonaqueous electrolytic solution may include components other than the above-mentioned components, for example, various additives such as a gas generating agent such as biphenyl (BP), cyclohexylbenzene (CHB), a thickener, and the like.

In the lithium ion secondary battery 100 in which lithium fluorosulfonate is added to the nonaqueous electrolytic solution, lithium fluorosulfonate is slightly decomposed in repeated charging and discharging, and a coating film derived from lithium fluorosulfonate is formed on the surface of the positive electrode active material. In the related art, the diffusion property of ions (for example, lithium ions) serving as charge carriers in the coating film is low, and the coating film increases battery resistance, so that low-temperature performance (in particular, discharge capacity when large current flows at low temperature) is poor. This is apparently because an inorganic compound component having low ion conductivity, such as $Li_2SO_4$, is formed in the coating film, so that the coating film derived from lithium fluorosulfonate is formed to have a structure which is insufficient for satisfactorily conducting ions.

However, in the present embodiment, since lithium fluorosulfonate and trilithium phosphate are present as components contributing to the formation of the coating film, a coating film which is derived from lithium fluorosulfonate and trilithium phosphate and which includes phosphorus is formed (supposedly a coating film is formed in which an organic compound and an inorganic compound in which Li, S, P, O, and F are combined together are adequately arranged).

Therefore, by using a lithium-nickel-manganese-cobalt-based composite oxide for a positive electrode active material and adequately controlling the content of trilithium phosphate and the content of lithium fluorosulfonate in the nonaqueous electrolytic solution, as described hereinabove, it is possible to ensure adequate decomposition of both trilithium phosphate and lithium fluorosulfonate and to form a coating film having high ion conductivity (in particular, the conductivity of ions serving as charge carriers) on the surface of the positive electrode active material. Thus, by combining a trilithium phosphate taken in a specific amount with a nonaqueous electrolytic solution including a specific amount of lithium fluorosulfonate, it is possible to provide the lithium ion secondary battery 100 with excellent low-temperature performance (in particular, the discharge capacity when large current flows at low temperature).

The lithium ion secondary battery 100 configured as described above can be used for various purposes. Suitable applications include a driving power supply installed on a vehicle such as an electric vehicle (EV), a hybrid vehicle (HV), a plug-in hybrid vehicle (PHV), or the like. Typically, the lithium ion secondary battery 100 can also be used in the form of a battery pack in which a plurality of lithium ion secondary batteries 100 is connected in series and/or in parallel.

The rectangular lithium ion secondary battery 100 including the flat-shaped wound electrode body 20 has been described hereinabove by way of example. However, the nonaqueous electrolyte secondary battery disclosed herein can also be configured as a lithium ion secondary battery including a stacked electrode body. Further, the nonaqueous electrolyte secondary battery disclosed herein can also be configured as a cylindrical lithium ion secondary battery. The nonaqueous electrolyte secondary battery disclosed herein can also be configured as a nonaqueous electrolyte secondary battery other than the lithium ion secondary battery.

sheet, the negative electrode sheet, the separator, and the nonaqueous electrolytic solution.

Low-Temperature Performance Evaluation

For each of the evaluation lithium ion secondary batteries prepared as described hereinabove, the discharge capacity obtained when large current was passed under a low-temperature environment of −15° C. was determined. Then, the ratio of the discharge capacity for each evaluation lithium ion secondary battery was calculated when a predetermined reference value of the discharge capacity was set to 100. The results are shown in Table 1.

TABLE 1

| Battery No. | Content in electrolytic solution (% by mass) | | | Content ratio n (% by mass) of $Li_3PO_4$ | Average particle diameter of $Li_3PO_4$ (μm) | Low-temperature performance (capacity ratio) |
|---|---|---|---|---|---|---|
| | $LiFSO_3$ | LiBOB | $LiPO_2F_2$ | | | |
| A1 | 0.15 | 0.50 | 0.50 | 1 | 10 | 123 |
| A2 | 0.15 | 0.10 | 0.10 | 5 | 11 | 111 |
| A3 | 1.0 | 0.50 | 0.50 | 1 | 10 | 131 |
| A4 | 1.0 | 0.50 | 0.50 | 5 | 10 | 114 |
| A5 | 0.5 | 0.50 | 0.50 | 2 | 10 | 140 |
| B1 | 1.1 | 0.50 | 0.50 | 0.5 | 10 | 88 |
| B2 | 0.1 | 0.50 | 0.50 | 0.5 | 10 | 86 |
| B3 | 1.1 | 0.50 | 0.50 | 6 | 10 | 92 |
| B4 | 0.1 | 0.50 | 0.50 | 6 | 10 | 81 |
| B5 | 0.5 | 0.10 | 0.10 | 0 | 11 | 79 |

Hereinafter, examples relating to the present teaching will be described, but the present teaching is not intended to be limited to the configurations shown in the examples.

Preparation of Evaluation Lithium Ion Secondary Batteries A1 to A5 and B1 to B5

$LiNi_{0.34}Co_{0.33}Mn_{0.33}O_2$(LNCM) with a layered rock-salt type structure as a positive electrode active material, trilithium phosphate ($Li_3PO_4$) having an average particle diameter shown in Table 1, acetylene black (AB) as a conductive material, and polyvinylidene fluoride (PVdF) as a binder were mixed with N-methyl-2-pyrrolidone (NMP) at a mass ratio of LNCM:$Li_3PO_4$:AB:PVdF=100:n:13:13 (n is a value shown in Table 1) to prepare a paste for forming a positive electrode active material layer. This paste was coated on an aluminum foil and dried to form a positive electrode active material layer. Subsequently, press treatment was performed to prepare a positive electrode sheet.

Further, natural graphite (C) as a negative electrode active material, styrene butadiene rubber (SBR) as a binder, and carboxymethyl cellulose (CMC) as a thickener were mixed with ion exchanged water at a ratio of C:SBR:CMC=98:1:1 to prepare a paste for forming a negative electrode active material layer. This paste was coated on a copper foil, dried, and pressed to prepare a negative electrode sheet.

A porous polyolefin sheet was prepared as a separator sheet.

A mixed solvent including ethylene carbonate (EC), ethyl methyl carbonate (EMC) and dimethyl carbonate (DMC) at a volume ratio of 1:1:1 was prepared, and $LiPF_6$ as a supporting salt was added to a concentration of 1.0 mol/L. Then, a nonaqueous electrolytic solution was prepared by adding lithium fluorosulfonate ($LiFSO_3$), lithium bis(oxalato)borate (LiBOB), and lithium difluorophosphate ($LiPO_2F_2$) so as to obtain the contents shown in Table 1.

The evaluation lithium ion secondary batteries A1 to A5 and B1 to B5 were prepared using the positive electrode From the results shown in Table 1, it is understood that when the mass ratio of trilithium phosphate with respect to the positive electrode active material is 1% by mass or more and 5% by mass or less and the content of lithium fluorosulfonate is 0.15% by mass or more and 1.0% by mass or less in the lithium ion secondary battery in which the lithium fluorosulfonate is added to the nonaqueous electrolytic solution, the discharge capacity is large when large current flows at low temperature.

Therefore, it is understood that the nonaqueous electrolyte secondary battery disclosed herein has excellent low-temperature performance.

Although specific examples of the present teaching have been described in detail above, these are merely illustrative and do not limit the scope of the claims. Techniques described in the claims include those in which the concrete examples exemplified hereinabove are variously modified and changed.

What is claimed is:

1. A nonaqueous electrolyte secondary battery comprising a positive electrode, a negative electrode, and a nonaqueous electrolytic solution, wherein
the positive electrode includes a positive electrode active material layer;
the positive electrode active material layer includes trilithium phosphate and, as a positive electrode active material, a lithium transition metal composite oxide having a layered rock salt type structure and being represented by the following formula (1);
the nonaqueous electrolytic solution includes lithium fluorosulfonate, lithium bis(oxalato)borate, and lithium difluorophosphate;
a mass ratio of the trilithium phosphate to the positive electrode active material is 1% by mass or more and 5% by mass or less;

a content of the lithium fluorosulfonate in the nonaqueous electrolytic solution is 0.15% by mass or more and 1.0% by mass or less;

a content of the lithium bis(oxalato)borate in the nonaqueous electrolytic solution is 0.1% by mass or more;

a content of the lithium difluorophosphate in the nonaqueous electrolytic solution is 0.1% by mass or more; and the trilithium phosphate has a particulate shape with an average particle diameter of 10 μm or less,

$$Li_aNi_xMn_yCo_zO_2 \tag{1},$$

wherein, in formula (1), a satisfies 0.98≤a≤1.20; x, y and z satisfy x+y+z=1; x satisfies 0.20≤x≤0.60; y satisfies 0<y≤0.50; and z satisfies 0<z≤0.50.

2. The nonaqueous electrolyte secondary battery according to claim 1, wherein x satisfies 0.34≤x≤0.60.

3. The nonaqueous electrolyte secondary battery according to claim 1, wherein a content of the lithium bis(oxalato)borate in the nonaqueous electrolytic solution is 0.5% by mass or more.

4. The nonaqueous electrolyte secondary battery according to claim 1, wherein a content of the lithium difluorophosphate in the nonaqueous electrolytic solution is 0.5% by mass or more.

* * * * *